Dec. 28, 1948.  V. ISACCO  2,457,376
AIRCRAFT WITH ROTATABLE SUSTAINING BLADES
Filed June 7, 1945  4 Sheets-Sheet 1

Vittorio Isacco  Inventor
By
Attorney

Inventor
Vittorio Isacco
By
Attorney

Dec. 28, 1948.   V. ISACCO   2,457,376
AIRCRAFT WITH ROTATABLE SUSTAINING BLADES
Filed June 7, 1945   4 Sheets-Sheet 3
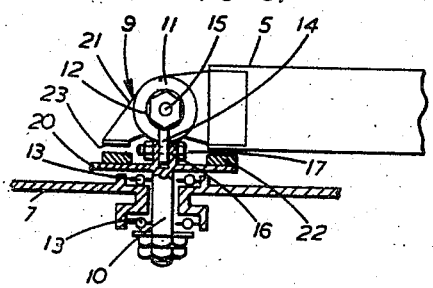
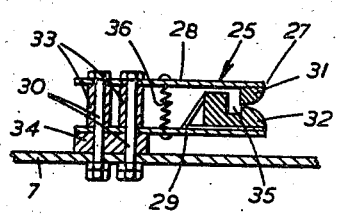
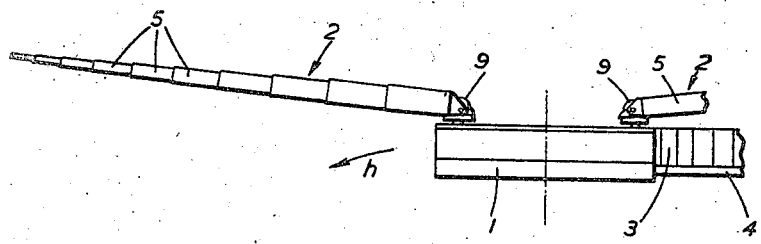
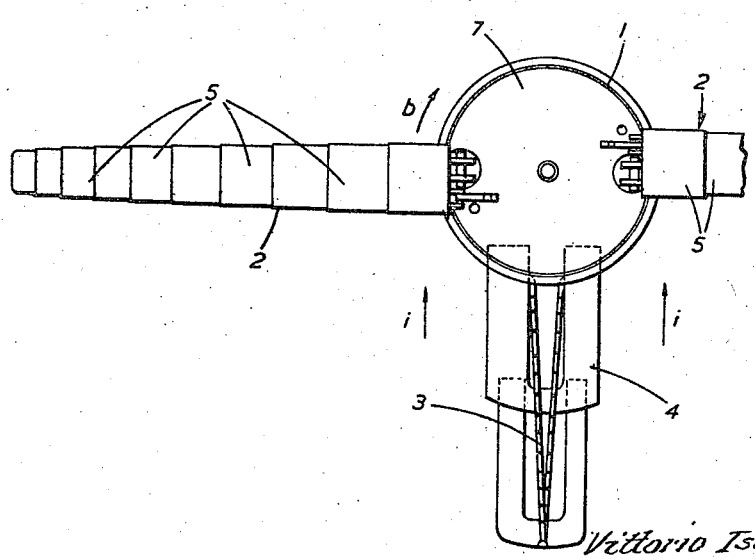
Inventor
Vittorio Isacco
By
Attorney Patented Dec. 28, 1948

2,457,376

UNITED STATES PATENT OFFICE 2,457,376

AIRCRAFT WITH ROTATABLE SUSTAINING BLADES

Vittorio Isacco, London, England

Application June 7, 1945, Serial No. 598,111
In France September 29, 1941

Section 1, Public Law 690, August 8, 1946
Patent expires September 29, 1961

18 Claims. (Cl. 244—138)

1

This invention has reference to parachutes with rotatable sustaining blades, that is individual parachutes, plane-cabins (cabins, crates or the like adapted to be dropped from aircraft) and whole plane parachutes.

The present invention comprises the following principal characteristics which can be applied separately or in combination.

The blades two in number as an example are constituted by substantially rigid telescopic elements entering one into the other so that the volume they occupy becomes approximately equal when folded up to that of the first element. There is thus realised a propeller of variable diameter during the extension which is effected under the action of the centrifugal force when the blades are started in rotation.

With the object of reducing as much as possible the volume occupied by the blades when their sections are nested, the first section of each blade can hinge around a vertical axis. The blades in this way take substantially parallel positions over the aircraft; the encumbrance in a top view of these bodies does not exceed sensibly that of the aircraft body.

When the release of the blades, by the action of suitable mechanism, is effected, the blades rotate under the action of the centrifugal force around the vertical axes until the blades find themselves sensibly in the continuation of one to the other. A locking device is provided for holding the blades in this position. There is also provided a system of elastic stops, or the like in view of the shock during this hinging movement and also to allow the blades to possess a certain elasticity in the drag direction, that is to say in the plane of rotation.

When the blades are being extended by the sliding of their elements one outwards of the other the centrifugal force which is generated as soon as the blades are started in rotation assures the extension of the blades.

With the object of limiting the inclination of the blades upwards and downwards, elastic stops or the like are provided. This limitation of the inclinations is achieved as well during the hinging period of the blades as during the sliding-out movement of the sections and also, after extension, during descent and landing. These stops are fixed over a small plate above the hinging axis of the blades.

Regarding the starting of the propeller in rotation, an elastic cable or cables permit of obtaining a powerful motor effort with small weight.

The elastic cable or cables are wound around

2 a single starting pulley but act on only one part of the circumference thereof which, in consequence, does not make a complete revolution, but owing to a multiplying gear the blades are caused to make a number of revolutions.

In view of the considerable effort exercised by the elastic cable, once in tension, on a stop or starting lever, this latter is provided with a roller or the like at the point at which it bears against the pulley.

For winding-up the motor, the blades are placed in their flight position that is to say one in the prolongation of the other, this allowing for the achievement of the manoeuvre by hand.

With the object of compensating for the torque reaction of the propeller during the starting of the blades in rotation, as well as for keeping the direction during the period of descent, suitable ailerons are fitted around the exterior of the aircraft, these ailerons being extended instantaneously as soon as the starting or opening wire is operated. These ailerons have their exterior end secured to one or more horizontal ailerons working like horizontal rudders: these latter ailerons are extended by means of an elastic device as soon as a stop which retains them is released, and it is while coming out of the aircraft-body that they carry with them the vertical ailerons, whereby extending the latter.

Other characteristics of the invention will appear from the following description, given as an example, with reference to the accompanying drawings in which:

Fig. 5 is a detail, chiefly in section, showing the mounting for the blades.

Fig. 6 is a detail, in section, showing means for holding a blade in its in use position.

Fig. 9 is a side elevation of the parachute in the position of descent, the blades and the vertical and horizontal ailerons being extended; and Fig. 10 represents the corresponding top view of the parachute.

The parachute comprises a case 1 and sustaining blades 2 mounted thereon. Within the case is a starting motor for setting the blades into rotation; around the case is a vertical aileron 3 adapted to be extended by an horizontal telescopic aileron 4 normally housed in the lower part of the case.

Figure 1:
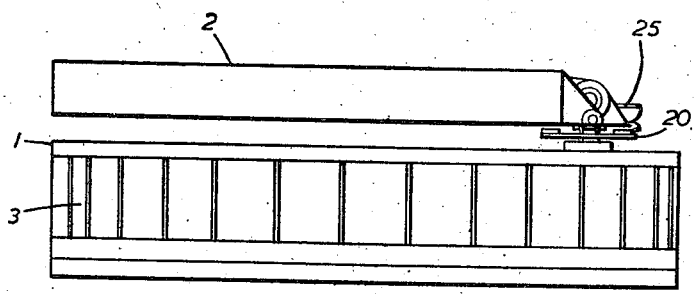
Fig. 1 is a side elevation of a two-blade parachute, the blades being collapsed and folded into their out of the way position.

The blades 1 are of telescopic form, that is to say, each blade comprises a number of telescopic sections 5. Flexible wires 6 which join successive telescopic sections together are of such a length that they limit the outward sliding or extending movement of each section to an extent sufficient to ensure adequate bearing support at the root of the section in the section immediately surrounding it. When the blades are set ready for use the sections are nested as shown in Figs. 1 and 2 and occupy the positions shown in these figures, each group of nested sections lying parallel with the other group above a horizontal cover plate 7 at the top of the case.

Figure 2:
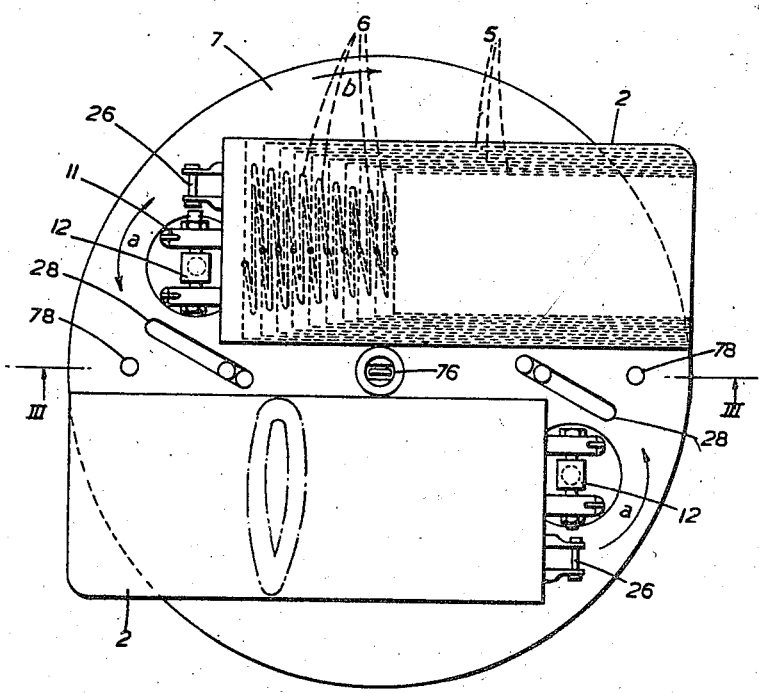
Fig. 2 is a plan view of the parachute shown in Fig. 1.
Figure 3:
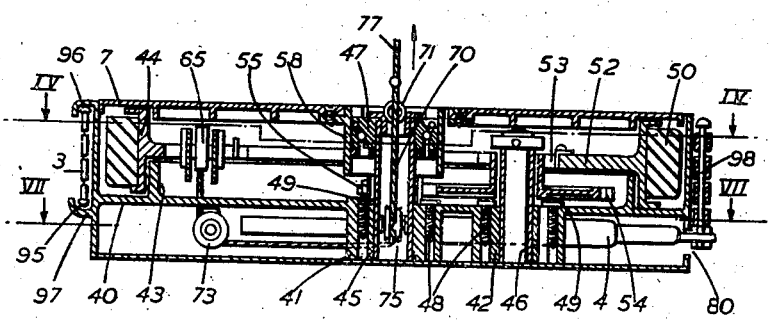
Fig. 3 is a sectional elevation of the parachute on the line III—III, Fig. 2, the blades and their mounting means being omitted.

The lateral dimensions of the space occupied by the blades in the Fig. 2 position are as shown, substantially equal to the lateral dimensions of the case 1.

The blades are mounted on the top plate. The means for effecting this is such that (a) the nested sections can turn freely from the positions shown in Figs. 1 and 2 to the positions where their axes are substantially in alignment diametrically (Figs. 9 and 10) and (b) each blade has limited movement about an horizontal axis.

For effecting (a) the said means comprises knuckle joints 9 at the root ends of the largest sections of the blades and rotatable spigots 10, the clevis 11 of each joint 9 being rigid with a blade section and the eye 12 of the joint being rigid with the spigot whilst the spigots are mounted on the top plate by thrust bearings 13 at diametrically opposite positions on the said plate near the periphery thereof. The said eyes comprise shanks 14 which are parallel with the axes of the hinge bolts 15 of the knuckle joints and are secured to complementary forks 16 at the tops of the spigots by means of bolts and nuts 17. Owing to the arrangement comprising the shanks 14 it is possible, within limits, to set the bolts 15 at any desired inclination to the horizontal—which inclination determines the incidence of the blades.

For effecting (b) the spigots 10 are flanged at their upper ends, the flanges being indicated by 20, the arms of the clevises are extended at 21 and the flanges and the extensions are respectively provided with buffers 22 and feet 23. Contact of the feet 23 with the buffers limits the upward inclination of the blades; contact of the undersides of the roots of the largest blade sections with the buffers limits the downward inclination.

Means is provided adapted to lock the blades in their in use positions (Figs. 9 and 10). The locking means is indicated by 25; it comprises pins 26 (Fig. 2) rigid with the roots of the largest blade sections and catches 27 mounted on the top plate 7. Each catch consists of two parallel arms 28 and 29 (see Fig. 6 more especially) secured to the top plate 7 by bolts 30, and resilient blocks 31, 32 preferably of rubber mounted on the arms 28 and 29 respectively, distance pieces 33 and 34 being located between the paired arms and between the arm 29 and the top plate 7. The outer ends of the blocks 31, 32 are rounded as shown to provide a flared entry to the space between each pair of arms and each block 32 is provided inwardly of the flare with a slot 35. Springs 36 pull the paired arms 28 and 29 tightly towards each other.

It will be seen that each pin 26 lies to one side of its corresponding spigot. The locking means 25 are so located that when the blades turn to their in use positions (i. e., turn in the direction of the arrows a) the pins enter the flares between the resilient blocks 31, 32 and by flexing the arms 28 and 29, first separate the blocks and then enter the slots 35. The opposite walls of the slots are plane and the back wall is higher than the meeting faces of the blocks. Thus, the pins once in the slots are held against unintentional release therefrom and against further movement in the direction of the arrow a. Therefore, the blades are held in their in-use positions, the slots being so located that they receive the pins 26 when the blades are in the position shown in Figs. 9 and 10. The slots do, however, permit the blades to oscillate on the hinge bolts 15 within the limits allowed by the buffers 22 and the blocks 31 and 32, because they are resilient, enable the blades to yield sufficiently to lateral stresses. To release the pins when it is desired to reset the blades it is necessary to lift the arms 28 by hand.

The blades are caused to turn to their in use position by rotation of the top plate 7 in the direction of the arrow b, Fig. 2; and the rotation causes the blades to extend by the centrifugal force developed (the sections being a sufficiently free fit in one another to permit of this).

The said rotation of the top plate and, therefore, of the blades, is effected by the starting motor in the case 1 and the rotation is continued for a short time by the motor after the blades have turned to the in use position and have become extended.

Between the ends of the case is a partition 40 which is provided on its underside with central and offset hollow bosses 41 and 42 respectively and is provided on its upper side with a co-axial flange 43. The said flange is embraced by the lower part of the driving pulley 44 of the starting motor and provides a bearing for it. The bosses 41 and 42 receive the lower ends of vertical bearing tubes 45 and 46 for toothed gearing comprised in the starting motor and, in addition, the tube 45 carries the top plate 7 of the apparatus through the intermediary of a thrust bearing 47, screws 48 which extend through flanges 49 on the tubes and enter the bosses securing the tubes in position on the partition. The construction of the bearing 47 is such that it withstands radial and axial stresses simultaneously.

The starting motor comprises the pulley 44, a starting elastic 50 wrapped round the pulley rim, an internally toothed wheel 51 fixed to spokes of the pulley by means of bolts 52, a pinion 53 in mesh with the wheel 51, a toothed wheel 54 rigid with and co-axial with the pinion 53 and a pinion 55 rigid with the inner element 56 of a one way drive coupling 57, elements 53 and 54 being borne by the tube 46 and elements 55 and 56 by the tube 45. The other element of the coupling is indicated by 58; it is rigid with the outer race of the thrust bearing 47 and with the top plate 7. One end (61) of the starting elastic is secured to the partition 40 by means of a pin 62 and the other end is secured to the pulley rim by a pin 63. Thus, when the elastic is in tension and the pulley is free to turn the elastic, through the pulley, the toothed gearing and the one way coupling turns the top plate 7 around the axis of the case 1, the gearing being multiplying gearing.

The pulley is held against rotation when the parachute is set ready to be used by means of a roller 65 engaging a projection 66 inside the pulley. The roller is mounted on a braced arm 67 which is turnably secured to the partition 40 by an horizontal pivot 68 and bearing brackets 69 therefor mounted on the partition. Ball bearings may be incorporated in the mounting 68—69. The roller is released from the projection 66 by pulling the arm downwards. This is effected by means of a flexible starting wire 70 extending from the roller end of the arm 67 to a ring 71 at the upper end of the tube 45, said wire being guided by pulleys 73, 74 mounted on the partition 40 and a pulley 75 in the bottom of the tube 45. An opening 76 is provided in the top plate 7 for the passage of the ring 71. The said ring 71 is also attached to one end of a second wire 77; the other end of the wire 77 is adapted to be fixed to a plane in such a manner (known in the art) that the wire becomes free of the plane when the falling parachute exerts a sufficiently powerful pull.

Holes 78 provided in the plate 7 are for the passage of the bits of a hand winding key (not shown) for tensioning the starting elastic. The elastic is shown tensioned in Fig. 4; the position which the end attached to the pulley takes when the elastic has contracted is indicated at 63ª in this figure. It will be seen that the length of the extended elastic is not greater than the circumference of the pulley.

The horizontal telescopic aileron 4 is located beneath the partition 40 and the side of the case has an opening 80 through which the said aileron can extend. This aileron, advantageously constituted by two parts, slides in the interior of the carrier. The first part 84 slides freely in guideways 82 and 83 on the partition 40 and the bosses (41 and 42) respectively, which guideways guide and sustain the said part 81. The second part 84 slides in the interior of the first part by means of the semi-circular guides 85.

When the ailerons 3 and 4 are in the positions shown in Figs. 1, 3, 4, 7 and 8, elastic cords 86 and 87 are in tension but the ailerons cannot extend because of lever 88 (Figs. 7 and 8) which prevents them from so doing.

The lever 88 is turnably mounted on the case 1 by means of a pivot 89.

As soon as the main starting wire 70 is pulled in the direction of arrow c (Fig. 3), the extension of the ailerons is obtained owing to the elastic cables 86 and 87 which push them outwards. In fact the lever 88 is operated in the direction of arrow d (Fig. 8) by means of the wire 90 joined to the main operating wire 70 which releases the starting motor.

The elastic cord 86 is connected to the interior of the part 81 and to the exterior of part 84. The small pulley allows for the elongation of the elastic cable in the interior and can also constitute the stop of the element 84 at the end of its movement. Element 81 is on the contrary joined to the case 1 on the outside by means of the elastic cords 87 and pulley 91, pulley 91 being mounted on the case 1 by means of the leg 92.

The operating wire for the releasing lever 88 of the ailerons is guided by pulleys 93 and 94 mounted on the case 1 and is secured to the wire 70 at 90¹.

Figure 4:
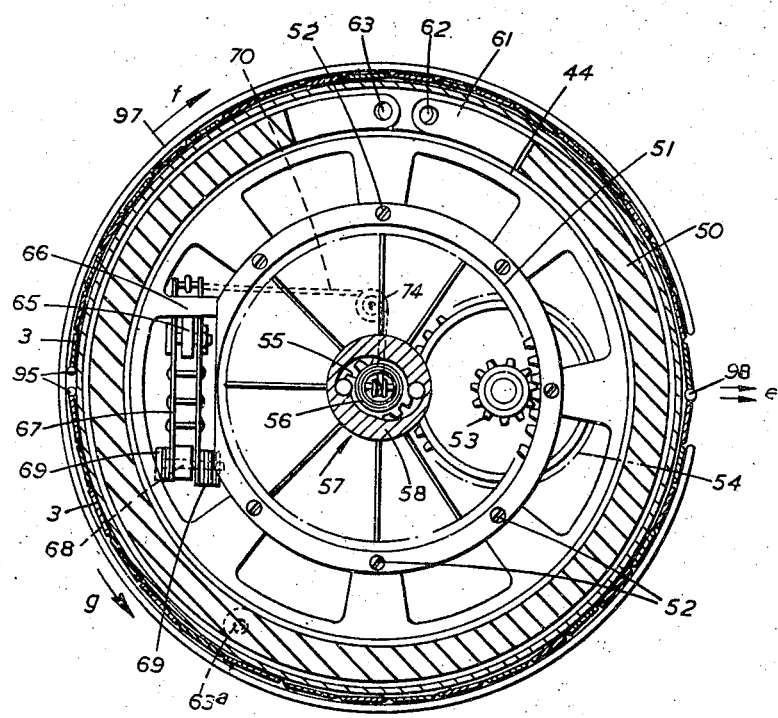
Fig. 4 is a sectional plan view on the line IV—IV, Fig. 3.
Figure 7:
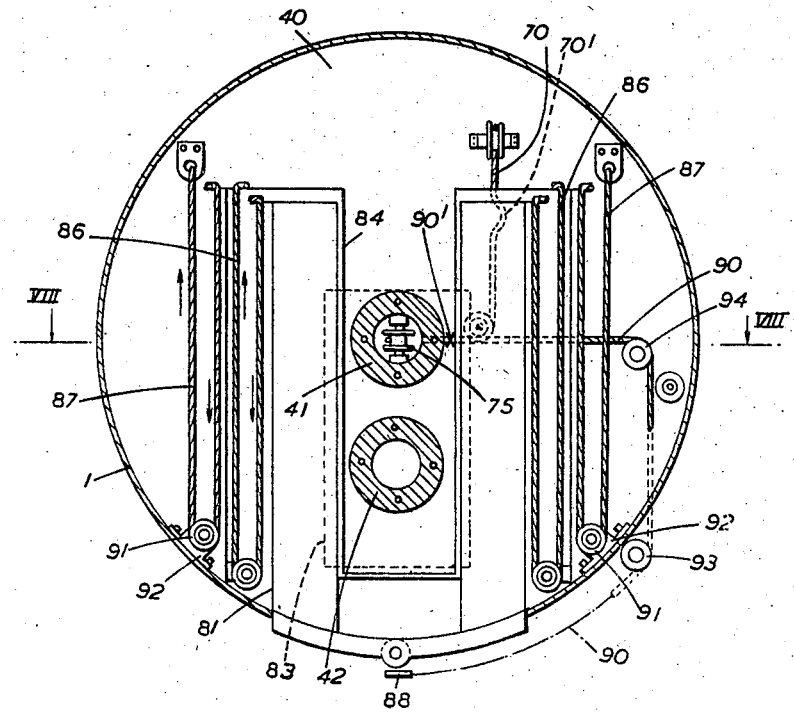
Fig. 7 is an underneath plan view in section, the plane of section being indicated by the lines VII—VII, Fig. 3, showing in top view the position of the vertical and horizontal ailerons before operation and the means which operates them.
Figure 8:
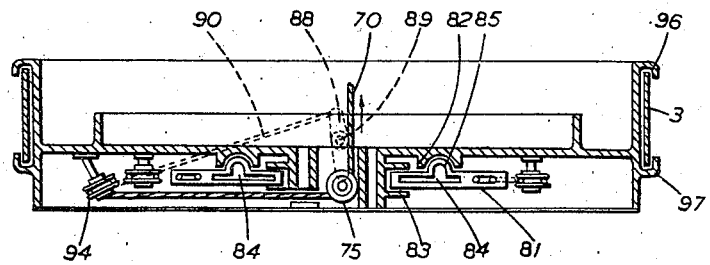
Fig. 8 is a vertical cross section of the elements shown in Fig. 7, the plane of section being indicated by the line VIII—VIII, Fig. 7.

The vertical ailerons are constituted by wooden elements or any other material, articulated so as to allow for their winding around the case 1 (and in one direction only, Fig. 4). They finish at one of their ends at bolts 95 allowing for their easy sliding in the interior of the flanges 96 and 97 solid with, or forming part of, the case 1 (Fig. 8). The other end of the ailerons is joined to a common bolt 98 which is firmly fixed to the horizontal aileron 4. This latter as stated above, is pushed out of the carrier horizontally owing to the elastic cords 86 and 87 as soon as the opening wire of the parachute is operated. The said aileron 4, in its horizontal sliding movement, in the direction of the arrows e, carries with it the bolt 97 and consequently the two ends of the ailerons which are attached to it. The vertical ailerons extend themselves in this way easily, in the direction of arrow f for one end and g for the other.

The displacement or extension of the ailerons of direction and horizontal is instantaneous as soon as the lever 88 is actuated.

It is advantageous to provide that the action of wire 70 is exerted at first on the secondary wire 90 in such a way as to obtain the extension of the ailerons previous to that of the blades. A simple play (e. g., loop 70¹, Fig. 7) in the operating wire 70 will give the required result.

The operation of the parachute is explained briefly as follows:

The parachute descends, closed (Figs. 1 and 2), and after a short time the wires 77 and 70 take the strain. Thereupon the wire 90 is tensioned to release the torque reaction ailerons 3 and 4 and immediately afterwards the wire 70 releases the pulley 44. Release of the pulley 44 enables the starting motor to spin the top plate 7. This causes the blades to hinge on their supporting spigots and to extend, the blades being held in their outwardly projecting position by the locking means 25. Thereafter the blades continue to rotate under the effect of the acquired starting speed and afterwards under the action of the oblique wind and/or the upwind during the period of descent.

Fig. 9 shows the aspect of the parachute (without the pilot's harness) in normal descent which is according to the direction of arrow h at the beginning of the fall from the plane. Fig. 10 shows the aspect in top view, the advancing speed being in the direction of the arrow i.

The device for fixing the parachute to the pilot is not indicated. It can be foreseen, for an individual parachute, as fixed either permanently over the pilot's head by means of rigid rods joined to the pilot's harness at the place of the shoulders and bearing over them, or on the back. In this last case, the rods are conveniently articulated so as to allow for the body of the parachute to hinge from the back until over the head, assisted or not in this movement by elastic cord apparatus supported by the braces which are attached to the pilot's body. At the end of this hinging movement, the opening wire 70 will be automatically operated, giving way immediately, as has been stated above, first to the extension of the vertical and horizontal ailerons and then to the extension of the blades.

It is understood that whilst keeping within the limits of the invention, one can bring to it all the modifications which do not alter its principle and to utilise for its realisation all the convenient materials; one can specially substitute for the details of realisation described, other equivalent systems.

One can specially utilise two or several starting elastics instead of only one and of any cross section. One can utilise an altogether different starting system, as an example, by gas, by compressed air, by powder or any explosive. In these other cases the mechanical devices are consequently altered.

The vertical and horizontal ailerons can be placed in another part than in the carrier, for example, either on the rods supporting the parachute over the shoulders, or also below the apparatus body when this latter is foreseen to be located over the pilot's back. In this case they will be folded in a convenient way and will be automatically extended during or at the end of the hinging movement of the parachute, from the back to above the head.

The locking device for the blades at the end of the hinging movement around the axis solid with the first element, can be realised in an altogether different way from the one foreseen.

The blades can be manufactured in all kinds of materials, either in light metals, or in plastic material presenting a certain elasticity and capable of supporting shocks without breaking or appreciable deformation, the system of telescopic elements remaining unaltered.

The wire joining the elements one to the other, can be replaced by rigid rods, by stops at their ends or by any other device.

The reduction gearing device by straight toothed wheels, can be replaced by toothed wheels of any other form, or by any other system of multiplication. These toothed wheels can be suppressed in case of utilisation of gas, compressed air or explosive for the starting.

The attaching device of the blades to the top cover-plate, can be realised in any other way from the one described and the inclination upwards as well as downwards can be limited by any other means.

The extension device of the vertical and horizontal ailerons, can be realised in an altogether different way from the one stated: also for the shape and constitution of these ailerons. The section of the blades indicated in dotted lines in Fig. 2 can be altogether different.

The winding-up of the elastic motors can be realised by an altogether different mechanical system fixed or not on the carrier.

The parachute can also finally be foreseen not only for an individual person but for various persons and even for a plane-cabin or for the entire plane.

For the application of the parachute to a cabin or to the whole of the plane, the starting system as also the mechanisms as described can be different. In such applications, the vertical and horizontal ailerons can be foreseen as definitely fixed on the cabin, the vertical and horizontal ailerons of the plane itself, could be utilised in the case of appliance to the whole of the plane. The starting wires can be replaced in totality or in part by rods and convenient levers.

What I claim is:

1. A parachute having rotatable sustaining blades, comprising a case, a top plate rotatably mounted on said case, means for rotating the top plate, sustaining blades each comprising a number of telescopic sections, hinge means having axes perpendicular to the plate for mounting the blades, means for limiting the relative outward movement of the telescopic sections of the blades, the blades being collapsed by folding on their hinge means to a position to overlie the top plate, the space occupied by the blades when folded and collapsed being substantially equal to the lateral dimensions of the case.

2. A parachute comprising a case, a rotatable member on said case, at least two pivot mountings on said rotatable member including vertical and horizontal pivots, at least two rotatable blades pivoted to said pivot mounting at their roots about the horizontal pivots and adapted to lie inoperatively over said member by turning about a vertical axis, each of said blades including a plurality of telescopic sections, means to rotate said rotatable member following the start of the fall to extend the telescopic sections of the blades by centrifugal force and means to limit the extension of the telescopic sections.

3. A parachute according to claim 2, wherein the blades when collapsed fold on their pivotal means to a position over the top plate and wherein rotation of the top plate turns the blades to their operative position in extended relation by centrifugal force, and wherein means are provided for locking the blades in the operative positions.

4. A parachute according to claim 2, wherein the blades when collapsed fold on their pivotal means to a position over the top plate and wherein rotation of the top plate turns the blades to their operative position in extended relation by centrifugal force, and wherein means comprising resilient elements are provided for locking the blades in the operative positions.

5. A parachute according to claim 2, wherein the blades when collapsed fold on their pivotal means to a position over the top plate and rotation of the top plate turns the blades to their operative position in extended relation by centrifugal force, and wherein means are provided for locking the blades in the position of use, and wherein resilient means are provided for limiting relative upward and downward movements of the blades during the periods when the blades are turning to their position of use and when they are in the said position.

6. A parachute according to claim 2, wherein means are provided for rotating the rotatable member comprising an elastic cord driving motor.

7. A parachute according to claim 2, wherein means are provided for rotating the rotatable member comprising an elastic cord driving motor, including a drum and an elastic cord therearound for rotating the drum, the length of the cord when extended being not greater than the circumference of the pulley.

8. A parachute according to claim 2, wherein means are provided for rotating the rotatable member comprising an elastic cord driving motor and multiplying gearing between the motor and the rotatable member.

9. A parachute according to claim 2, wherein a driving motor is provided for rotating the rotatable member, said motor comprising a spring element in a state of strain, and means to release to motor for driving the rotatable member.

10. A parachute according to claim 2, wherein means are provided for rotating the rotatable member comprising an elastic cord driving motor, said motor including a drum, a strained elastic cord around the drum and a movable stop to releasably hold the drum against rotation by the strained cord, said stop comprising an anti-friction element contacting with a part of the drum.

11. A parachute according to claim 2, wherein a starting wire serves to operate the means for rotating the rotatable member.

12. A parachute according to claim 2, wherein is provided a driving motor for rotating the rotatable member, said motor comprising a spring element in a state of strain, a starting wire and means releasably holding the motor idle, said starting wire when operated actuating the means holding the motor idle and operating the motor driving function.

13. A parachute according to claim 2, comprising a collapsible vertical aileron and a collapsible horizontal aileron, said ailerons being normally collapsed, means for extending said ailerons, said extending means being in a strained state, a stop for normally maintaining the strained state of the extending means and a wire to operate the stop to cause the ailerons to be extended.

14. A parachute according to claim 2, comprising a collapsible vertical aileron and a collapsible horizontal aileron, said ailerons being normally collapsed, means for extending said ailerons, said extending means being in a strained state, a stop for normally maintaining the strained state of the extending means, a driving motor for rotating the rotatable member, said motor comprising a spring element under strain, means releasably holding the motor idle, and two starting wires, one of said wires when pulled serving to operate the stop to extend the ailerons and the other of said wires when pulled serving to operate the means for holding the motor idle and cause the motor to drive the rotatable member.

15. A parachute comprising a case, a top plate rotatably mounted on said case, a motor within the case for rotating the top plate, sustaining blades each comprising a number of telescopic sections, means for limiting the relative outward movement of the telescopic sections, bearings on the top plate and substantially vertical spigots rotatably mounted in the bearings, hinge means securing the roots of the blades to the spigots, the hinging axes of said hinge means being substantially horizontal, resilient means adapted to limit up and down movements of said blades about the said hinging axes, and means to lock said blades in outwardly extending positions with respect to the case.

16. A parachute according to claim 15, wherein means are provided for adjusting the incidence of the blades.

17. A parachute comprising a case, a rotatable member on said case, at least two rotatable blades articulated around an horizontal axis at their roots and pivoted to said rotatable member and lying inoperatively over said member, and swinging out by centrifugal force, and means to lock automatically the blades in a position of use on rotation of said member, each of said blades being formed of interfitting telescopic sections extended outwardly by centrifugal force on rotation of said member, and means to limit the extension of the telescopic sections.

18. A parachute according to claim 17, wherein is provided a collapsible vertical aileron and a collapsible horizontal aileron, said vertical aileron being normally located around said case and said horizontal aileron being normally located within said case, means for extending the ailerons, said means being in a strained state, a stop for normally maintaining the strained state of the aileron-extending means, and a wire acting when pulled to operate the stop to cause the ailerons to be extended.

VITTORIO ISACCO.

REFERENCES CITED

The following references are of record in the file of this patent:

UNITED STATES PATENTS

| Number | Name | Date |
| --- | --- | --- |
| 1,855,084 | Alvistur | April 19, 1932 |

FOREIGN PATENTS

| Number | Country | Date |
| --- | --- | --- |
| 800,738 | France | May 11, 1936 |
| 814,599 | France | Mar. 22, 1937 |